United States Patent
Kozakura (10) Patent No.: US 11,269,494 B2
(45) Date of Patent: Mar. 8, 2022

(54) IMAGE PROCESSING APPARATUS, METHOD THEREFOR, AND STORAGE MEDIUM STORING PROGRAM

(71) Applicant: CANON KABUSHIKI KAISHA, Tokyo (JP)

(72) Inventor: Kozue Kozakura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/828,451

(22) Filed: Mar. 24, 2020

(65) Prior Publication Data

US 2020/0319756 A1 Oct. 8, 2020

(30) Foreign Application Priority Data

Apr. 4, 2019 (JP) .............................. JP2019-072294

(51) Int. Cl.
*G06F 3/0482* (2013.01)
*G06F 3/0484* (2013.01)
*G06F 3/04847* (2022.01)

(52) U.S. Cl.
CPC ........ *G06F 3/0482* (2013.01); *G06F 3/04847* (2013.01)

(58) Field of Classification Search
CPC ............... G06F 3/0482; G06F 3/04847; G06T 2200/24
See application file for complete search history.

(56) References Cited

U.S. PATENT DOCUMENTS

| | | | | |
|---|---|---|---|---|
| 7,973,950 B1* | 7/2011 | Tieskoetter | ........... | G06F 3/1205 358/1.13 |
| 2005/0102635 A1* | 5/2005 | Jiang | ................. | H04M 1/72403 715/851 |
| 2007/0186183 A1* | 8/2007 | Hudson | ................. | G06F 3/0482 715/810 |
| 2008/0098327 A1* | 4/2008 | Berkovitz | ............. | G06F 3/0481 715/803 |
| 2012/0047434 A1* | 2/2012 | Ginetti | ................. | G06F 40/166 715/255 |
| 2013/0332857 A1* | 12/2013 | Kim | ..................... | H04N 21/854 715/753 |
| 2014/0115536 A1* | 4/2014 | Akiya | ................ | H04N 1/00453 715/810 |

(Continued)

FOREIGN PATENT DOCUMENTS

JP 2000-57322 A 2/2000
JP 2013118510 A * 6/2013

*Primary Examiner* — Andrew T Chiusano
(74) *Attorney, Agent, or Firm* — Canon U.S.A., Inc. I.P. Division (57) ABSTRACT

An image processing apparatus includes a processor and a memory storing a program which, when executed by the processor, causes the image processing apparatus to perform operations. A plurality of editing instructions for each editing item is received. Editing processing is performed on an image based on each of the editing instructions. A history of each of the editing instructions is recorded into a predetermined recording area. A history selected based on a different condition between a first editing item for which each of the editing instructions is currently received and a second editing item that is other than the first editing item is displayed on a screen. The selected history is from a history recorded in the predetermined recording area.

19 Claims, 7 Drawing Sheets

(56) References Cited

U.S. PATENT DOCUMENTS

2020/0073858 A1* 3/2020 Maeda ................ G06F 3/04845
2020/0278996 A1* 9/2020 Mizuno ................ G06F 3/0482
2020/0319756 A1* 10/2020 Kozakura ............. G06F 3/0482

* cited by examiner

IMAGE PROCESSING APPARATUS, METHOD THEREFOR, AND STORAGE MEDIUM STORING PROGRAM

BACKGROUND

Field

The present disclosure relates to an image processing apparatus for performing image editing processing, a method therefor, and a storage medium storing a program.

Description of the Related Art

One conventionally practiced technique is to perform a series of editing processing procedures on an image, store a history indicating in what order the editing processing procedures have been performed, what kinds of editing processing procedures have been performed, and which values have been used in the editing processing procedures, and display the history on a screen (Japanese Patent Application Laid-Open No. 2000-57322).

Then, the editing processing is repeatedly performed on the image using various values for each item of the editing processing to acquire an optimum editing result. In such a case, the conventional technique ends up in displaying a large amount of histories indicating a plurality of values regarding a plurality of editing processing procedures, thereby being inconvenient. This leads to making it difficult for a user to find a desired history from among the large amount of histories.

SUMMARY

According to an aspect of the present disclosure, an image processing apparatus includes a processor, and a memory storing a program which, when executed by the processor, causes the image processing apparatus to perform operations including: receiving a plurality of editing instructions for each editing item, performing editing processing on an image based on each of the editing instructions, recording a history of each of the editing instructions into a predetermined recording area, and performing control to display, on a screen, a history selected based on a different condition between a first editing item for which each of the editing instructions is currently received and a second editing item that is other than the first editing item, wherein the selected history is from a history recorded in the predetermined recording area.

Further features of the present disclosure will become apparent from the following description of exemplary embodiments with reference to the attached drawings.

DESCRIPTION OF THE EMBODIMENTS

In the description below, a representative exemplary embodiment of the present disclosure will be described in detail by way of example with reference to the drawings. However, components and elements that will be described in the exemplary embodiment are merely cited as examples, and are not intended to limit the scope of the present disclosure only to them.

Figure 1:
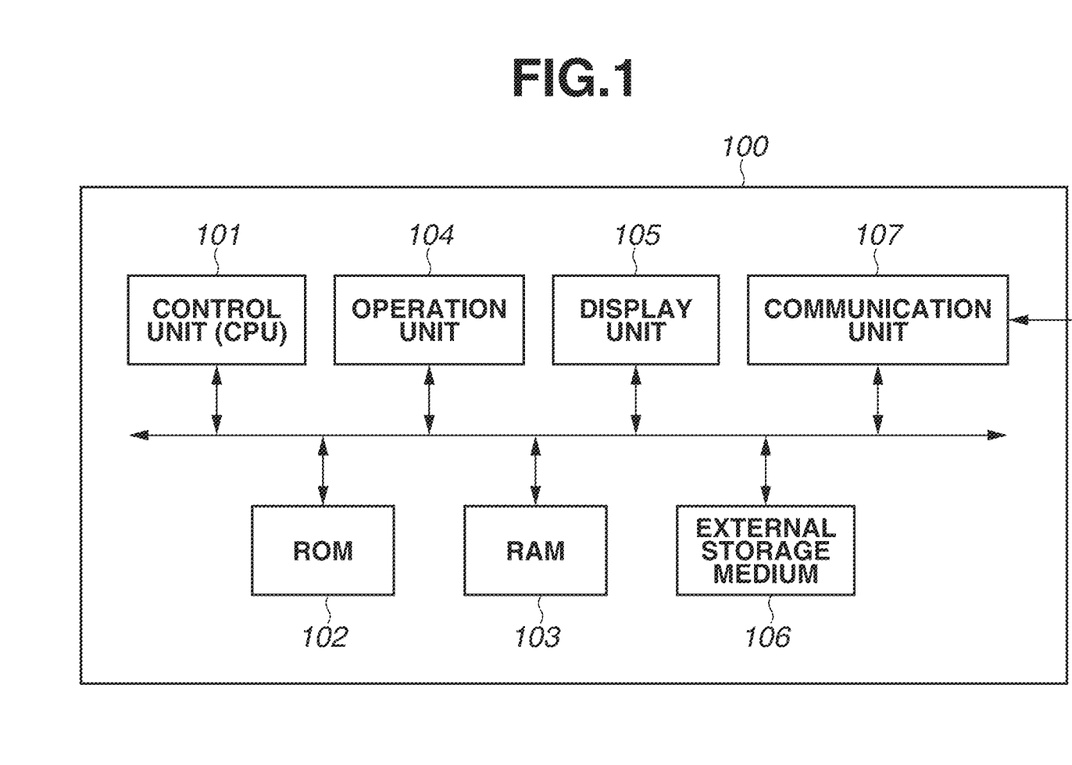
FIG. 1 is a block diagram illustrating an example of a configuration of an image processing apparatus according to an exemplary embodiment of the present disclosure.

FIG. 1 illustrates a hardware configuration of an image processing apparatus 100 according to a first exemplary embodiment. The image processing apparatus 100 includes an arithmetic processing device (central processing unit (CPU)) 101 that controls the entire image processing apparatus 100 and controls operations of image editing processing and history management processing. A read only memory (ROM) 102 is a hard disk drive or a solid state drive (SSD) that records therein an execution program of the image editing processing and digital data such as a coded image signal in a readable format. A random access memory (RAM) 103 is configured in such a manner that a program code and the digital data recorded in the ROM 102 are loaded thereto and the control unit 101 executes them. An operation unit 104 is embodied by a keyboard and a mouse, or a touch panel. The control unit 101 detects an input from the operation unit 104, and the program loaded in the RAM 103 is notified thereof, by which processing is performed. A display unit 105 is a cathode ray tube (CRT) display, a liquid crystal panel, or the like, and displays various kinds of information thereon. In the present exemplary embodiment, the operation unit 104 and the display unit 105 are provided integrally as a touch panel. An external storage medium 106 can store therein an original image, and an image editing result generated by applying the editing processing on the original image. A communication unit 107 is an interface for connecting to a network line such as the Internet or an interface for communicating with an external device, and can receive an image that will be handled as an editing target.

Functions and processing of the image processing apparatus 100 to be described below are implemented by the control unit 101 reading out the application program of the image editing processing stored in the ROM 102 or the external storage medium 106 and executing the program.

Further, the image processing apparatus 100 according to the present exemplary embodiment may be implemented by using a single computer device or by using a plurality of computer devices, as necessary, by distributing the functions to the plurality of computer devices. In the case where the image processing apparatus 100 includes the plurality of computer devices, the computer devices are connected to be able to transmit and receive various kinds of data and commands to and from each other via communication such as a local area network (LAN).

Figure 2:
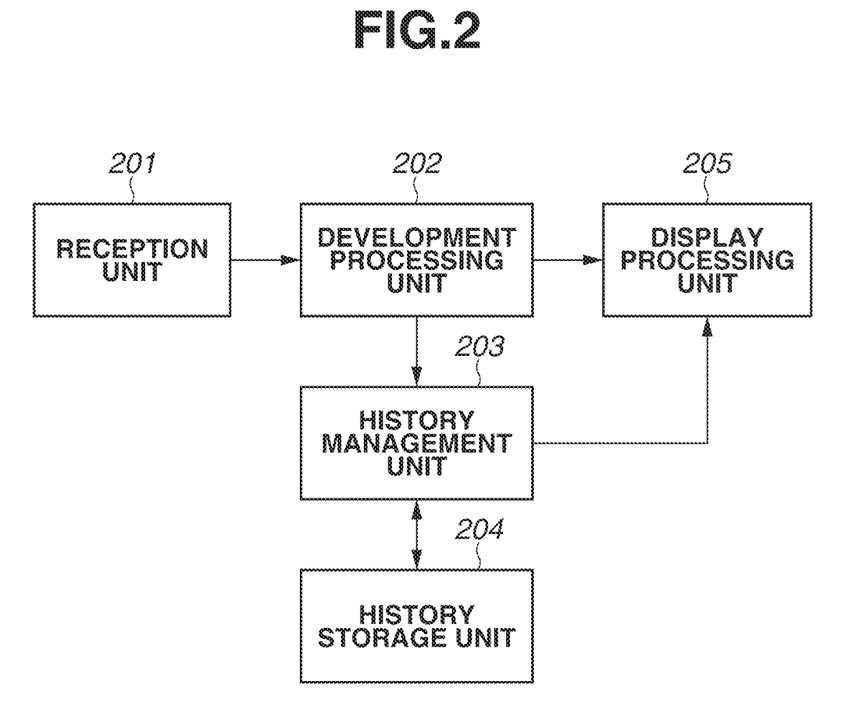
FIG. 2 is a block diagram illustrating an example of functions implemented by the image processing apparatus according to the exemplary embodiment of the present disclosure.

FIG. 2 is a block diagram illustrating a functional configuration of the image processing apparatus 100. The image processing apparatus 100 includes a reception unit 201, a development processing unit 202, a history management unit 203, a history storage unit 204, and a display processing unit 205. The reception unit 201 receives various kinds of instructions according to a user operation. The development processing unit 202 performs development processing on the original image. In the present exemplary embodiment, the original image targeted for the processing is a raw image. The history management unit 203 manages an order in which values of an exposure and white balance regarding an adjustment in a series of raw development processing procedures on the raw image are edited, and the values thereof as history information. Then, the history management unit 203 records the order and the values into a predetermined recording area in the external storage medium 106 (the history storage unit 204). Further, the history management unit 203 also records an order in which editing processing such as rotation and trimming is performed on the raw image, and an angle and a coordinate thereof, as the history information. The display processing unit 205 performs processing for controlling display of various kinds of information on the display unit 105.

Figure 3:
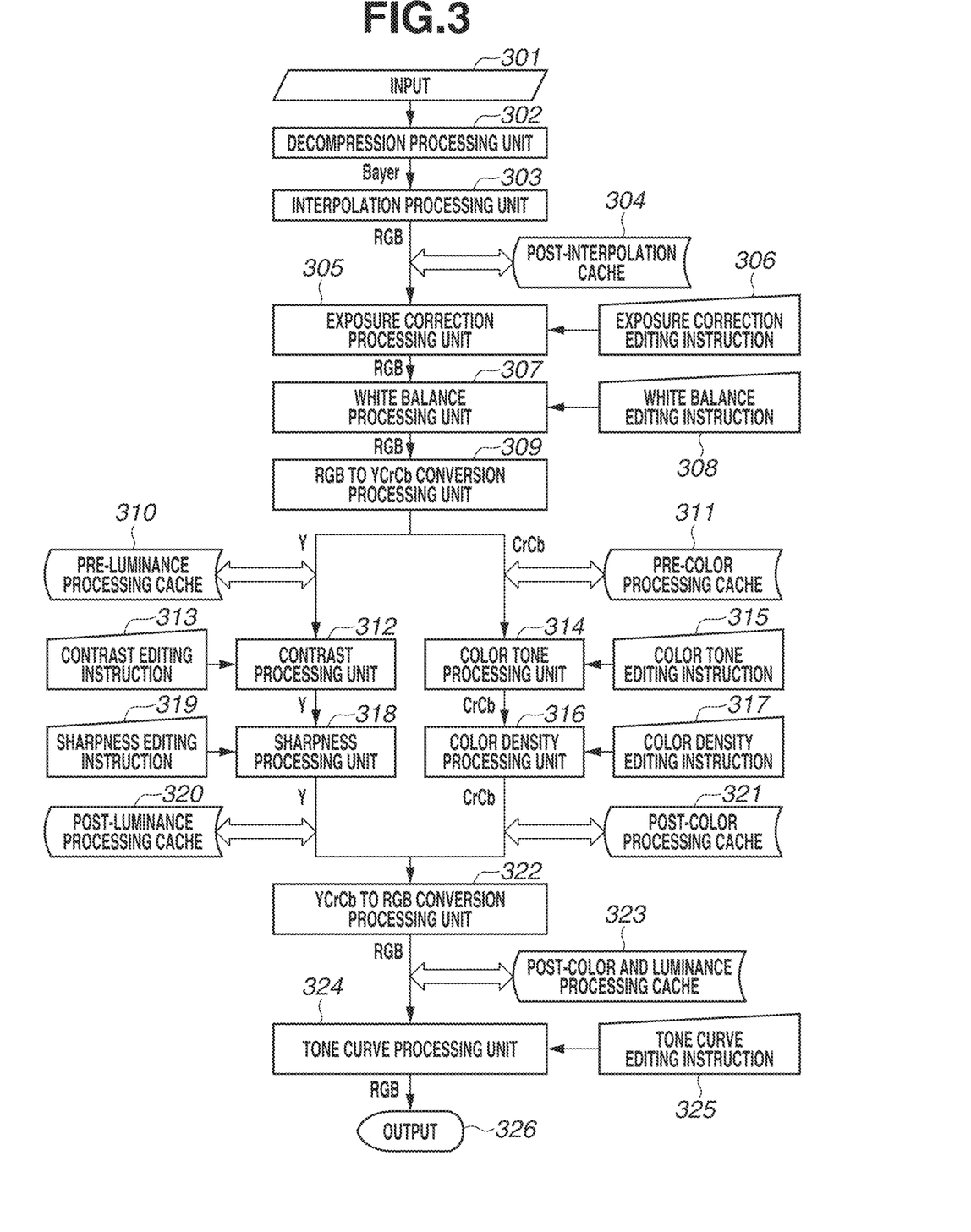
FIG. 3 is a block diagram illustrating an example of functions of a development processing unit implemented by the image processing apparatus according to the exemplary embodiment of the present disclosure.

FIG. 3 is a block diagram illustrating a functional configuration of the development processing unit 202. The development processing unit 202 performs the development processing on the raw image. The order of the development processing is predetermined. When acquiring an editing instruction via the reception unit 201, the development processing unit 202 changes an adjustment value based on the editing instruction, and performs the development processing on the raw image using the changed adjustment value.

An input 301 illustrated in FIG. 3 is a coded raw image, and an imaging condition is added thereto. The raw image is decompressed by a decompression processing unit 302, and is converted into bayer data in which Red-Green-Blue (RGB) data is laid out in a grid-like manner. The bayer data is converted into RGB data by being subjected to interpolation processing by an interpolation processing unit 303. The RGB data after the interpolation processing is saved in a post-interpolation cache 304. The data in the post-interpolation cache 304 can be reused until the development processing is ended. Thus, when the second editing instruction or an instruction subsequent thereto is issued, the development processing unit 202 can use the data in the post-interpolation cache 304 while omitting the decompression processing and the interpolation processing.

An exposure correction processing unit 305 changes values of the RGB data that are values affecting exposure correction processing based on an input exposure correction editing instruction 306. A white balance processing unit 307 changes the values of the RGB data that are values affecting the white balance processing based on an input white balance editing instruction 308. A conversion processing unit 309 converts the RGB values into luminance, chrominance-blue, and chrominance-red (YCbCr) values, and transfers a Y value among them to a contrast processing unit 312 and transfers Cr and Cb to a color tone processing unit 314. The values before luminance-related processing and color-related processing are applied thereto are saved in a pre-luminance processing cache 310 and a pre-color processing cache 311, respectively, as intermediate results.

The intermediate results saved in the pre-luminance processing cache 310 and the pre-color processing cache 311 can be reused unless the adjustment values of the exposure correction and the white balance are changed. Thus, when an editing instruction directed to an editing item different from the exposure correction and the white balance is received, the development processing unit 202 can use the data in the pre-luminance processing cache 310 and the pre-color processing cache 311 while skipping the processing until that.

The contrast processing unit 312 changes the Y value based on an input contrast editing instruction 313. The color tone processing unit 314 changes the Cr value and the Cb value based on an input color tone editing instruction 315. A color density processing unit 316 changes the Cr value and the Cb value based on an input color density editing instruction 317. A sharpness processing unit 318 changes the Y value based on an input sharpness editing instruction 319. The Y data and the CrCb data generated by the sharpness processing unit 318 and the color density processing unit 316 are saved in a post-luminance processing cache 320 and a post-color processing cache 321, respectively, as intermediate results.

The data in the post-luminance processing cache 320 can be reused unless the adjustment value of the exposure correction, the white balance, the contrast, or the sharpness is changed. The data in the post-color processing cache 321 can be reused unless the adjustment value of the exposure correction, the white balance, the color tone, or the color density is changed.

A conversion processing unit 322 converts the YCrCb values into RGB values. The RGB values acquired as a result thereof are saved in a post-color and luminance processing cache 323 as an intermediate result for reuse. A tone curve processing unit 324 edits the RGB data based on a tone curve editing instruction 325 issued from the user. Then, the edited RGB data is provided as an output 326.

The processing for developing the raw image is performed using the above-described procedure. The intermediate results saved in the caches 304, 310, 311, 320, 321, and 323 are not newly generated as long as they are reusable, and the existing intermediate result is discarded and a new intermediate result is generated and recorded only when the reuse has become impossible or at least not possible. As a result, even when the editing instruction is issued from the user, the development processing unit 202 can yield the editing result quickly by partially omitting the development processing depending on the editing item.

Figure 4:
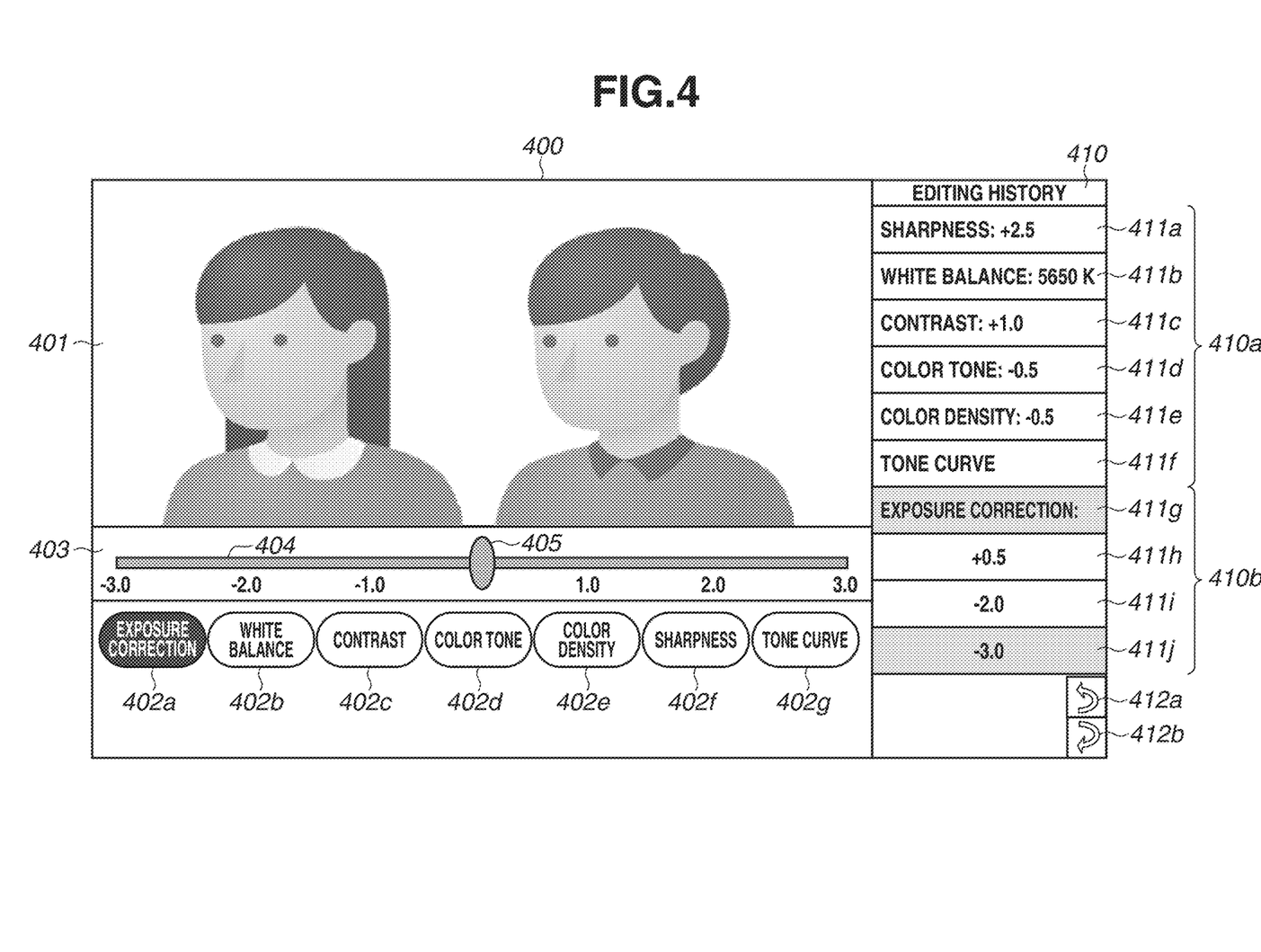
FIG. 4 illustrates an example of an image editing screen according to the exemplary embodiment of the present disclosure.

FIG. 4 illustrates an example of an image editing screen 400 displayed on the display unit 105 by the control unit 101 executing the image editing application program in the present exemplary embodiment.

An image based on the result of performing the development processing on the raw image by the development processing unit 202 is displayed in an image region 401. Further, each time the raw image is edited, the image after the editing is updated and displayed.

Editing buttons 402a to 402g (editing buttons 402) corresponding to the exposure correction, the white balance, the contrast, the color tone, the color density, the sharpness, and the tone curve, respectively, are displayed on the image editing screen 400. Pressing of any of the editing buttons 402a to 402g causes a display of an editing operation region 403 for receiving an operation for adjusting the value of the editing item corresponding to the pressed editing button. In the example illustrated in FIG. 4, the editing button 402a of the exposure correction is pressed, and a slider bar 404 for inputting a value of the exposure correction is displayed. The adjustment value of the slider bar 404 is adjustable in a range of −3.0 to +3.0. When a position of a slider 405 is changed on the slider bar 404 by an operation by the user, the development processing unit 202 performs the exposure correction processing using the adjustment value corresponding to the position of the slider 405. Then, the display processing unit 205 displays an image based on a result of the development processing reflecting the editing of the value of the exposure correction in the image region 401. The editing operation region 403 may be any user interface (UI) allowing the user to input the adjustment value in a display format appropriate for the editing item, and may be such a UI that the adjustment value is input by using a drop-down box or a check box instead of the slider bar. The editing operation region 403 according to the present exemplary embodiment is an example of an input field for the adjustment value of the editing item.

A plurality of pieces of history information 411a to 411j that indicates contents of the editing previously carried out on the raw image is displayed in chronological order of the editing from the top to the bottom in an editing history region 410. The pieces of history information 411a to 411j are displayed while being categorized into two stages, an editing completed history region 410a and an editing ongoing history region 410b. In the editing completed history region 410a, only an already edited editing item and a finally determined adjustment value of each editing item are displayed. In the editing ongoing history region 410b, an editing item currently in process of editing and all of used adjustment values are displayed. More specifically, the exposure correction, which is the name of the editing item currently in process of editing, is displayed in 411g, and the adjustment values currently in process of editing are displayed in 411h to 411j in an order in which they are changed. The editing ongoing history region 410b has been described referring to the example in which all pieces of editing ongoing history information are selected and displayed therein. However, an upper limit may be set on the number of pieces of history information displayed therein. In such a case, when the number of editing instructions directed to the editing item currently in process of editing exceeds a maximum number, only the maximum number of most recent adjustment values among all of the pieces of editing ongoing history information are displayed therein.

The adjustment value is a value corresponding to the position at which the slider 405 operated in the editing operation region 403 corresponding to the editing item is stopped. Each time the slider 405 is moved and stopped, the adjustment value is acquired. Then, each time the adjustment value is acquired, the development processing unit 202 performs the development processing on the raw image using the adjustment value, and the adjustment value is additionally displayed in the editing ongoing history region 410b as history information 411.

On the image editing screen 400 illustrated in FIG. 4, any one of the pieces of history information displayed in the editing history region 410 can be selected by an operation by the user. The currently selected history information is displayed in a display manner different from that of the other history information. The example illustrated in FIG. 4 indicates that the history information in the editing ongoing history region 410b is currently selected and that the history information 411g and the history information 411j are focused on by being displayed in a different manner from the other history information. The history information 411g and the history information 411j indicate the currently selected editing item and adjustment value, respectively. Backgrounds of the currently selected history information 411g and history information 411j are distinguishably displayed in a different color from the other pieces of history information 411a to 411f, and 411h and 411i.

History movement icons 412a and 412b are buttons for moving the focus and inputting an instruction to change the editing item or the adjustment value that is being selected. The focus is moved upward one by one each time the history movement icon 412a is pressed and is moved downward one by one each time the history movement icon 412b is pressed. In the example illustrated in FIG. 4, if the history movement icon 412a is pressed while the focus is placed on the history information 411j, the focus is moved from the history information 411j to 411i and to 411h in order while the focus is kept on the editing item name of the history information 411g. If the history movement icon 412a is further pressed, the focus is moved to the history information 411f. However, the history information 411f here is the editing completed history region 410a, so that the focus on the editing item name of the history information 411g is removed, and only the history information 411f is focused on and brought into a selected state. If the history movement icon 412a is pressed in this state, the focus is moved upward from the history information 411f in an order of the history information 411e, 411d, 411c, 411b, and 411a. Then, if the history movement icon 412b is pressed in the state in which the focus is placed on the history information 411a, the focus is moved downward in an order of the history information 411b, 411c. 411d, 411e, and 411f. If the history movement icon 412b is further pressed, the editing item name of the history information 411g and the adjustment value of the history information 411h are brought into the focused state at the same time. If the history movement icon 412b is pressed in this state, the focus placed on the history information 411h is moved downward in an order of the history information 411i and 411j while the history information 411g is kept in the focused state.

Each time the currently selected history information is changed by moving the focus on the history information upward or downward in this manner, the development processing unit 202 performs the development processing using the adjustment value corresponding to the currently selected history information and displays the image based on the result of the development processing in the image region 401.

Selection of the history information has been described referring to the example in which the history information is selected by moving the focus one by one upward or downward by the operation on the history movement icon 412a and the history movement icon 412b. However, the image editing screen 400 can also be configured to allow desired history information to be selected by the user performing a tap operation on each piece of history information in the editing history region 410.

A range in which the focus is moved using the history movement icons 412a and 412b may be limited to only the history information in the editing ongoing history region 410b. Alternatively, the image editing screen 400 may be configured in such a manner that the history movement icons 412a and 412b are prepared for each of the editing completed history region 410a and the editing ongoing history region 410b. Further, when the editing history region 410 is hidden, the above-described range may be limited to only the history information in the editing ongoing history region 410b.

Figure 5:
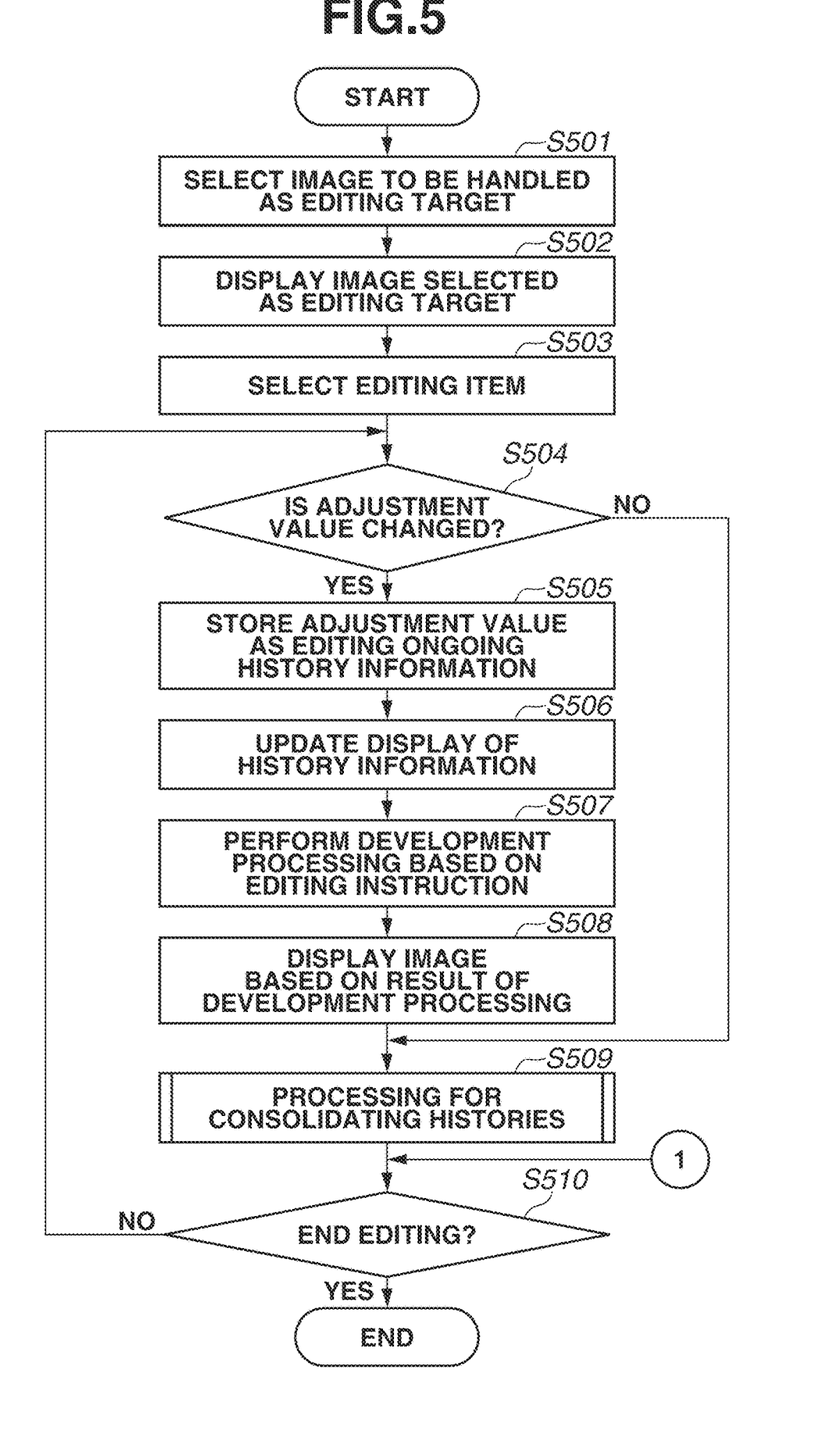
FIG. 5 is a flowchart illustrating an example of processing performed by the image processing apparatus according to the exemplary embodiment of the present disclosure.

FIG. 5 is a flowchart illustrating the image editing processing performed by the image processing apparatus 100. Processing performed by each unit that will be described below is implemented by the control unit 101 operating based on an operating system (OS) and the image editing application program.

In step S501, the control unit 101 selects the raw image to be handled as the editing target. For example, the control unit 101 displays a list of thumbnail images respectively corresponding to a plurality of raw images stored in the external storage medium 106 on the display unit 105. Then, the control unit 101 selects a raw image corresponding to a thumbnail image specified in response to a user operation as the editing target.

In step S502, the control unit 101 performs control to display the raw image selected as the editing target on the display unit 105. First, the development processing unit 202 performs the development processing on the raw image selected as the editing target using the existing adjustment value. Then, the display processing unit 205 displays the image based on the result of the development processing in the image region 401 of the image editing screen 400.

In step S503, the control unit 101 selects the editing item. When the reception unit 201 receives the editing instruction through any one of the editing buttons 402a to 402g on the image editing screen 400 by receiving a user operation, the editing item corresponding to the one editing button 402 through which the editing instruction has been received is selected. At this time, the display processing unit 205 displays the editing operation region 403 corresponding to the selected editing item on the image editing screen 400.

In step S504, the control unit 101 determines whether the adjustment value of the selected editing item is changed. If the reception unit 201 receives the user operation for changing the adjustment value in the editing operation region 403, the control unit 101 determines that the adjustment value is changed (YES in step S504), and the processing proceeds to step S505. If the reception unit 201 receives no change to the adjustment value (NO in step S504), the processing proceeds to step S509. Whether the adjustment value is changed is determined during a period from when the editing item is selected or the editing operation region 403 is displayed until a predetermined time passes.

If the adjustment value is changed (YES in step S504), in step S505, the control unit 101 stores the editing item currently in process of editing and the adjustment value into the external storage medium 106 in association with the raw image as the editing ongoing history information. The editing ongoing history information is the history of the editing item for which the editing instruction is currently received by receiving the user operation, and is an undetermined editing content.

Now, the history management unit 203 stores the editing content (changed editing item and adjustment value) into the external storage medium 106 while adding it to a history information group corresponding to a series of editing tasks with respect to the raw image as the editing ongoing history information. A plurality of series of editing tasks can be performed on one raw image. In such a case, a plurality of "history information groups" corresponding to the series of editing tasks, respectively, is stored in the external storage medium 106 in association with the one raw image.

In step S506, the control unit 101 updates the editing ongoing history region 410b based on the editing content, and displays it. The display processing unit 205 displays the information indicating the editing content received in step S504 while adding it to the bottom in the editing ongoing history region 410b.

In step S507, the control unit 101 performs the development processing on the raw image using the changed adjustment value of the editing item. At this time, the development processing unit 202 performs the development processing using the intermediate result saved in each of the caches as appropriate, as described above.

In step S508, the control unit 101 displays the image based on the result of the development processing in the image region 401 of the image editing screen 400.

In step S509, the control unit 101 performs processing for consolidating the editing histories. Details thereof will be described with reference to FIG. 6, which will be described below.

In step S510, the control unit 101 determines whether an instruction to end the image editing processing is received. If the end instruction is received (YES in step S510), the present processing is ended. If the end instruction is not received (NO in step S510), the processing proceeds to step S504.

Figure 6:
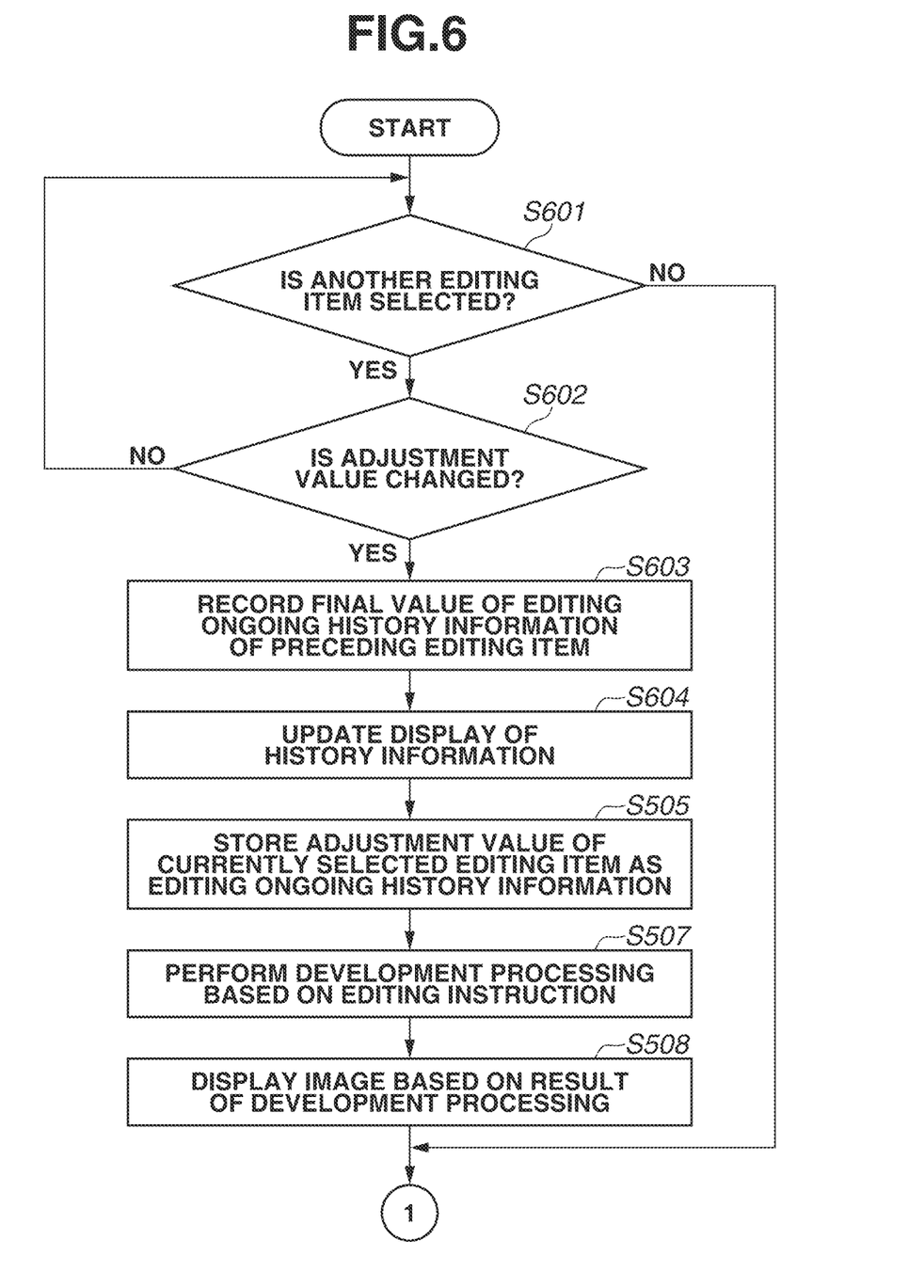
FIG. 6 is a flowchart illustrating an example of processing performed by the image processing apparatus according to the exemplary embodiment of the present disclosure.

FIG. 6 is a flowchart illustrating the processing for consolidating the editing histories in step S509 illustrated in FIG. 5, which is performed by the image processing apparatus 100.

In step S601, the control unit 101 determines whether the editing item is switched to another editing item. The reception unit 201 receives selection of any of the editing buttons 402a to 402g on the image editing screen 400 by receiving a user operation. If a different editing button 402 from the editing button 402 selected before the start of the processing in step S601 is newly selected, the control unit 101 determines that the editing item is switched to another editing item.

If the editing item is switched to another editing item (YES in step S601), in step S602, the control unit 101 determines whether the adjustment value of the editing item after the switching is changed in a similar manner to the processing in step S504.

If the adjustment value is changed (YES in step S602), in step S603, the control unit 101 selects and copies the last history information among the pieces of history information (editing ongoing history information) of the editing item selected before the start of the processing in step S601, and stores it into the external storage medium 106 while adding it to the history information group corresponding to the series of editing tasks with respect to the raw image as editing completed history information. More specifically, in the present exemplary embodiment, when receiving the switching to the new editing item (B) and the editing instruction, the control unit 101 determines to set the editing content (adjustment value) of the last editing instruction among the plurality of editing instructions issued with respect to the immediately preceding editing item (A), and ends the reception of the editing instruction directed to the editing item (A) for now. In step S602, the control unit 101 may delete the editing ongoing history information from the external storage medium 106 after copying the last history information. In other words, the editing histories other than the determined editing history are deleted from the external storage medium 106, and a load on a storage capacity can be reduced.

In step S604, the control unit 101 updates the editing history region 410 and displays it. The display processing unit 205 reads out the history information (editing completed history information) copied in step S603 from the external storage medium 106, and displays it while adding it to the bottom in the editing completed history region 410a. In addition, the display processing unit 205 displays the name of the editing item after the editing item is switched in step S601 as the editing item name of the editing ongoing history region 410b, and displays the information indicating the editing content received in step S602 at the top in the editing ongoing history region 410b.

Figure 7A:
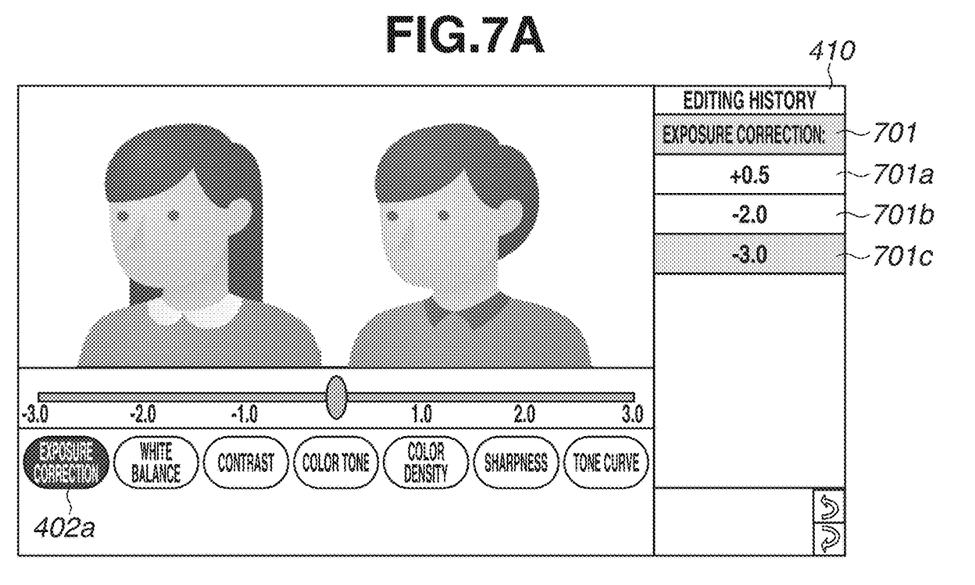
FIGS. 7A and 7B are diagrams each illustrating an example of the image editing screen according to the exemplary embodiment of the present disclosure.

FIG. 7A illustrates an example of the image editing screen 400 displayed on the display unit 105 while, for example, the "exposure correction" is selected as the editing item and the adjustment value of the exposure correction is repeatedly changed. The image editing screen 400 is displayed in such a manner that the focus is placed on the editing button 402a among the plurality of editing buttons 402. Further, the image editing screen 400 is displayed in such a manner that adjustment values 701a to 701c are displayed thereon and the focus is placed on the adjustment value 701c. By presenting such a display, the image editing screen 400 can indicate, to the user, that the editing item currently in process of editing is the "exposure correction" corresponding to the editing button 402a, the adjustment value is changed in an order of "+0.5", "−2.0", and "−3.0", and the currently selected adjustment value is "−3.0". Further, an image based on a result of the development processing using the currently selected adjustment value "−3.0" is displayed in the image region 401.

Figure 7B:
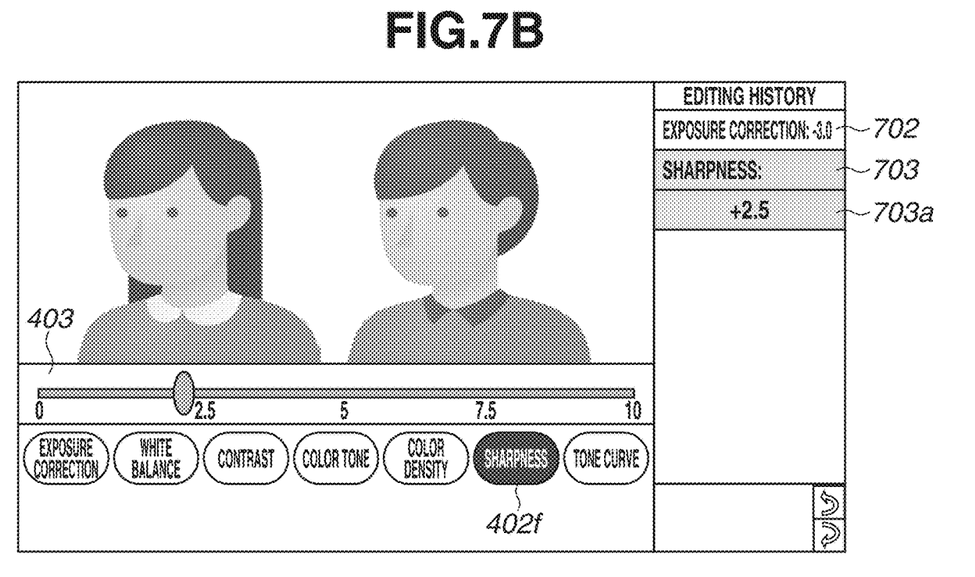

Then, FIG. 7B illustrates an example of the image editing screen 400 displayed on the display unit 105 after the editing item is switched from the "exposure correction" to the "sharpness". The image editing screen 400 is displayed in such a manner that the focus is placed on the editing button 402f among the plurality of editing buttons 402. Further, the image editing screen 400 is displayed in such a manner that the focus is placed on an adjustment value 703a. By presenting such a display, the image editing screen 400 can indicate, to the user, that the editing item currently in process of editing is the "sharpness", the adjustment value is first changed to "+2.5", and the currently selected adjustment value is also "+2.5". Further, for the "exposure correction", which is the editing item before the switching, "−3.0" corresponding to the adjustment value 701c changed last is displayed in an adjustment value 702. In addition, an image based on a result of the development processing using the currently selected adjustment value "+2.5" of the sharpness and the adjustment value "−3.0" of the already edited exposure correction is displayed in the image region 401.

The control unit 101 can keep the editing ongoing history information before the editing item is switched without deleting it from the external storage medium 106, and can first display the adjustment value 702 as the editing completed history information and then display the editing ongoing history information before the editing item is switched on an upper part relative to the adjustment value 702 in response to a user operation. This operation allows the user to switch between displaying only the determined adjustment value and displaying all the adjustment values with respect to the already edited editing item depending on the user's necessity, thereby improving usability of the user.

Then, the control unit 101 performs processing similar to steps S505, S507, and S508. After that, the processing proceeds to step S510.

A trigger for determining the editing content (adjustment value) with respect to the editing item (A) and ending the reception of the editing instruction directed to the editing item (A) for now is not limited to the reception of the switching to the different editing item (B) and the editing instruction as in the above-described example. For example, an end of the image editing application may be treated as a trigger. Alternatively, switching of the image set as the editing target to another image may be treated as the trigger. Alternatively, switching of the history information group corresponding to the series of editing tasks to another group may be treated as the trigger. Alternatively, a change of the editing history region 410 from a displayed state to a hidden state may be treated as the trigger.

In this manner, the image processing apparatus 100 according to the present exemplary embodiment displays all the changed adjustment values as the editing history with respect to the editing item currently in process of editing. On the other hand, the image processing apparatus 100 displays only the finally determined adjustment value with respect to the editing item for which the adjustment value has already been determined. This display allows the user to, in chronologically arranging the editing histories with respect to the raw image and selecting the editing history to confirm the editing result, easily select and confirm only the final result with respect to the already determined editing item and confirm the result for each adjustment value with respect to the editing item currently in process of editing. Thus, the user's visibility can be improved by making the displayed history content different between the editing item currently in process of editing and the other editing item.

According to the exemplary embodiment of the present disclosure, advantageous effects of preventing the display of the history from becoming complicated, improving the user's visibility, and allowing the user to easily find the desired history can be achieved even in a case where the editing processing is repeatedly performed using various values for each of the items of the editing processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-072294, filed Apr. 4, 2019, which is hereby incorporated by reference herein in its entirety.

What is claimed is:

1. An image processing apparatus comprising:
a processor; and
a memory storing a program which, when executed by the processor, causes the image processing apparatus to perform operations including:
receiving a plurality of editing instructions for each editing item,
performing editing processing on an image based on each of the plurality of editing instructions,
recording, as a plurality of histories, a history of each of the plurality of editing instructions into a predetermined recording area,
performing control to display, on a screen, a history selected from the plurality of histories based on a different condition between a first editing item for which each of the plurality of editing instructions is currently received and a second editing item that is other than the first editing item, wherein the plurality of histories, each corresponding to an undetermined editing content, is displayed on the screen for the first editing item, and one history corresponding to a determined editing content is displayed on the screen for the second editing item, and
deleting, when an editing content of the second editing item is determined, histories other than the one history corresponding to the determined editing content among plural histories recorded in association with the second editing item,
wherein the selected history is from a history recorded in the predetermined recording area.

2. The image processing apparatus according to claim 1, wherein, among plural histories recorded in association with the first editing item, a maximum number of the plurality of histories, recorded in association with the first editing item, are displayed.

3. The image processing apparatus according to claim 1, wherein the determined editing content is a history recorded last among the plurality of histories recorded in association with the second editing item.

4. The image processing apparatus according to claim 1, wherein executing the program causes the image processing apparatus to perform further operations including:
changing from the second editing item to the first editing item, and
determining a last editing instruction directed to the second editing item as the editing content of the second editing item when (i) the second editing item is changed to the first editing item, and (ii) an editing instruction directed to the first editing item is received by a reception unit.

5. The image processing apparatus according to claim 1, wherein executing the program causes the image processing apparatus to perform further operations including:
changing the image to another image, and
determining a last editing instruction directed to the second editing item as the editing content of the second editing item when the image is changed to the another image.

6. The image processing apparatus according to claim 1, wherein executing the program causes the image processing apparatus to perform further operations including:
recording, as a group, histories corresponding to a series of editing tasks with respect to the image,
changing the group to another group, and
determining a last editing instruction directed to the second editing item as the editing content of the second editing item when the group is changed to the other group.

7. The image processing apparatus according to claim 1, wherein executing the program causes the image processing apparatus to perform further operations including selecting, in order and based on a received user operation, a history of the first editing item and a history of the second editing item displayed on the screen.

8. The image processing apparatus according to claim 1, wherein executing the program causes the image processing apparatus to perform further operations including selecting, based on a received user operation, histories of the first editing item in order from among histories of the first editing item and a history of the second editing item displayed on the screen.

9. The image processing apparatus according to claim 1, wherein each of the plurality of editing instructions is an instruction for specifying an adjustment value of an editing item regarding raw development processing.

10. The image processing apparatus according to claim 1, wherein each of the plurality of editing instructions is an instruction for specifying at least one of an angle of rotation and a coordinate of trimming with respect to the image.

11. A method for an image processing apparatus, the method comprising:
receiving a plurality of editing instructions for each editing item;
performing editing processing on an image based on each of the plurality of editing instructions;
recording, as a plurality of histories, a history of each of the plurality of editing instructions into a predetermined recording area;
performing control to display, on a screen, a history selected from the plurality of histories based on a different condition between a first editing item for which each of the plurality of editing instructions is currently received and a second editing item that is other than the first editing item, wherein the plurality of histories, each corresponding to an undetermined editing content, is displayed on the screen for the first editing item, and one history corresponding to a determined editing content is displayed on the screen for the second editing item; and
deleting, when an editing content of the second editing item is determined, histories other than the one history corresponding to the determined editing content among plural histories recorded in association with the second editing item,
wherein the selected history is from a history recorded in the predetermined recording area.

12. A non-transitory computer-readable storage medium storing a program to cause a computer to perform a method for an image processing apparatus, the method comprising:
receiving a plurality of editing instructions for each editing item;
performing editing processing on an image based on each of the plurality of editing instructions;
recording, as a plurality of histories, a history of each of the plurality of editing instructions into a predetermined recording area;
performing control to display, on a screen, a history selected from the plurality of histories based on a different condition between a first editing item for which each of the plurality of editing instructions is currently received and a second editing item that is other than the first editing item, wherein the plurality of histories, each corresponding to an undetermined editing content, is displayed on the screen for the first editing item, and one history corresponding to a determined editing content is displayed on the screen for the second editing item; and deleting, when an editing content of the second editing item is determined, histories other than the one history corresponding to the determined editing content among plural histories recorded in association with the second editing item, wherein the selected history is from a history recorded in the predetermined recording area.

13. An image processing apparatus comprising:

a processor; and a memory storing a program which, when executed by the processor, causes the image processing apparatus to perform operations including:

receiving a plurality of editing instructions for each editing item, wherein an editing content for an editing item is changed each time an editing instruction is received, performing editing processing on an image based on each of the plurality of editing instructions, recording, as a plurality of histories, respective editing contents of the plurality of editing instructions for the editing item into a predetermined recording area, applying an editing content corresponding to one history among the plurality of histories for the editing item to the image, and performing control to display, on a screen, a history for the editing item in a manner that is different between a first editing item for which each of the plurality of editing instructions is currently received and a second editing item that is other than the first editing item, wherein, for the first editing item, the one history to which the editing content applied to the image corresponds is displayed on the screen together with other histories corresponding to editing contents not applied to the image, and wherein, for the second editing item, the one history to which the editing content applied to the image corresponds is displayed on the screen without the other histories corresponding to the editing contents not applied to the image.

14. The image processing apparatus according to claim 13, wherein each of the plurality of editing instructions is an instruction for specifying an adjustment value of an editing item regarding raw development processing.

15. The image processing apparatus according to claim 13, wherein each of the plurality of editing instructions is an instruction for specifying at least one of an angle of rotation or a coordinate of trimming with respect to the image.

16. The image processing apparatus according to claim 13, wherein the histories for the editing item are displayed in an order in which the editing instructions corresponding to the histories are received.

17. The image processing apparatus according to claim 13, wherein the one history for the first editing item and the one history and the other histories for the second editing item are displayed on the screen together with the image to which a first editing content corresponding to the one history for the first editing item and a second editing content corresponding to the one history for the second editing item are applied.

18. A method for an image processing apparatus, the method comprising:

receiving a plurality of editing instructions for each editing item, wherein an editing content for an editing item is changed each time an editing instruction is received;

performing editing processing on an image based on each of the plurality of editing instructions;

recording, as a plurality of histories, respective editing contents of the plurality of editing instructions for the editing item into a predetermined recording area;

applying an editing content corresponding to one history among the plurality of histories for the editing item to the image; and performing control to display, on a screen, a history for the editing item in a manner that is different between a first editing item for which each of the plurality of editing instructions is currently received and a second editing item that is other than the first editing item, wherein, for the first editing item, the one history to which the editing content applied to the image corresponds is displayed on the screen together with other histories corresponding to editing contents not applied to the image, and wherein, for the second editing item, the one history to which the editing content applied to the image corresponds is displayed on the screen without the other histories corresponding to the editing contents not applied to the image.

19. A non-transitory computer-readable storage medium storing a program to cause a computer to perform a method for an image processing apparatus, the method comprising:

receiving a plurality of editing instructions for each editing item, wherein an editing content for an editing item is changed each time an editing instruction is received;

performing editing processing on an image based on each of the plurality of editing instructions;

recording, as a plurality of histories, respective editing contents of the plurality of editing instructions for the editing item into a predetermined recording area;

applying an editing content corresponding to one history among the plurality of histories for the editing item to the image; and performing control to display, on a screen, a history for the editing item in a manner that is different between a first editing item for which each of the plurality of editing instructions is currently received and a second editing item that is other than the first editing item, wherein, for the first editing item, the one history to which the editing content applied to the image corresponds is displayed on the screen together with other histories corresponding to editing contents not applied to the image, and wherein, for the second editing item, the one history to which the editing content applied to the image corresponds is displayed on the screen without the other histories corresponding to the editing contents not applied to the image.

* * * * *